United States Patent [19]

Neff et al.

[11] 4,110,860
[45] Sep. 5, 1978

[54] LEVELER ASSEMBLY FOR A LOADING DOCK

[75] Inventors: Robert O. Neff, Milwaukee; Lynn O. Grunwald, Cudahy; Roderick B. Potter, Milwaukee; Norbert Hahn, Cudahy, all of Wis.

[73] Assignee: Rite-Hite Corporation, Cudahy, Wis.

[21] Appl. No.: 819,046

[22] Filed: Jul. 26, 1977

[51] Int. Cl.² .............................................. B65G 69/24
[52] U.S. Cl. ................................................ 14/71.7
[58] Field of Search ...................... 14/71.7, 69.5, 71.1, 14/71.3; 91/411 R

[56] References Cited

U.S. PATENT DOCUMENTS

| | | | |
|---|---|---|---|
| 2,644,971 | 7/1953 | Rowe | 14/71.7 |
| 2,881,457 | 4/1959 | Rodgers | 14/71.7 |
| 2,993,219 | 7/1961 | Pennington | 14/71.7 |
| 3,201,814 | 8/1965 | LeClear | 14/71.7 |
| 3,290,710 | 12/1966 | Whitenack | 14/71.7 |
| 3,345,665 | 10/1967 | Anderson | 14/71.7 |
| 3,388,413 | 6/1968 | Clarke | 14/71.7 |
| 3,456,274 | 7/1969 | McGuire | 14/71.7 |
| 3,685,076 | 8/1972 | Loblick | 14/71.7 |
| 3,694,839 | 10/1972 | Loblick | 14/71.7 |

*Primary Examiner*—Nile C. Byers
*Attorney, Agent, or Firm*—Neuman, Williams, Anderson & Olson

[57] ABSTRACT

A leveler assembly is provided for mounting within a pit which is normally formed in a loading dock. The pit includes a base recessed a substantial distance below the platform surface of the dock, a rear wall, an open top and an open front side. The assembly includes a frame anchored within the pit adjacent the base thereof. The frame includes a front section disposed adjacent the open front side of the pit and recessed a substantial distance from the open top. The frame also includes a rear section having a top portion disposed adjacent to but beneath the pit open top. Hingedly connected to the rear section top portion is a loading bearing deck member which is adapted to normally assume a neutral position, wherein the exposed surface thereof is substantially coplanar with the dock platform surface. Adjustably connected to the underside of the deck member at a location spaced rearwardly a substantial distance from the front edge of the deck member is a first fluid pressure-responsive telescoping component. A complemental second fluid pressure-responsive telescoping component is adjustably connected to the frame front section. The telescoping components coact with one another to effect pivoting of the deck member to selected positions either up or down relative to the neutral position. Control means are provided for regulating the fluid pressure to the telescoping components and, thus, the orientation of the deck member.

7 Claims, 11 Drawing Figures

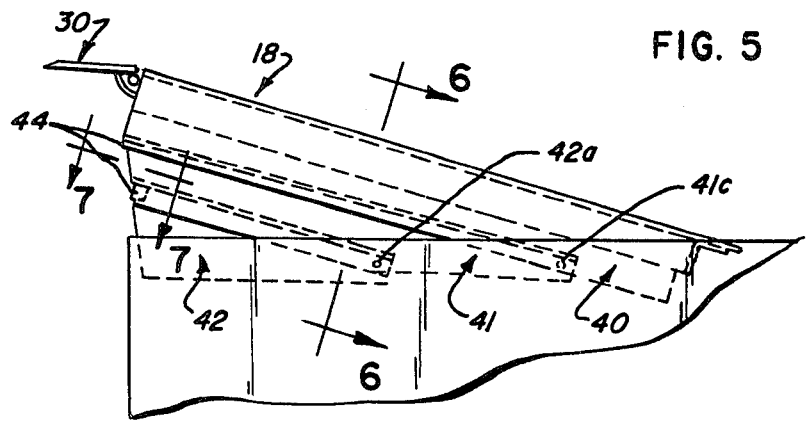
FIG. 5
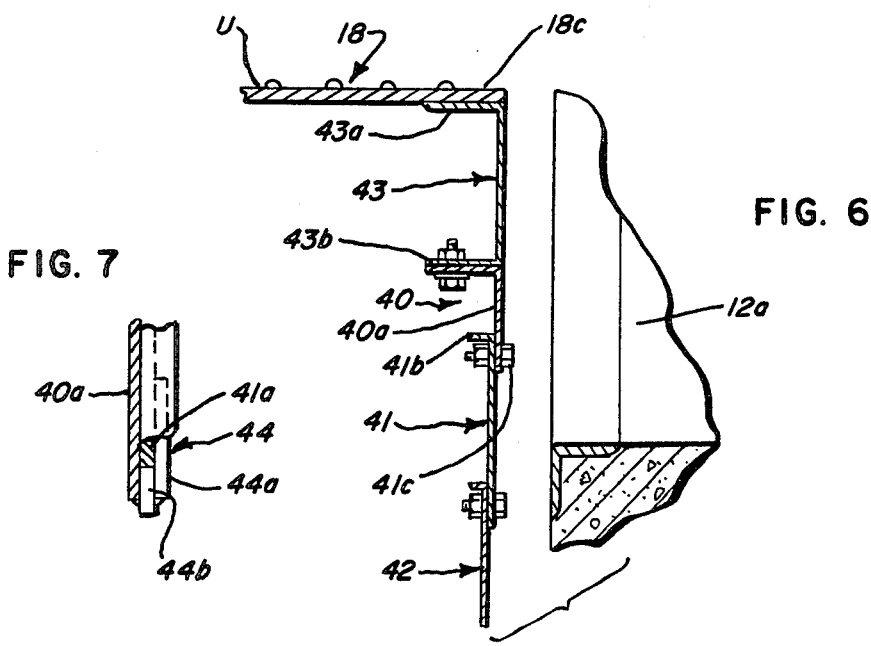
FIG. 7
FIG. 6
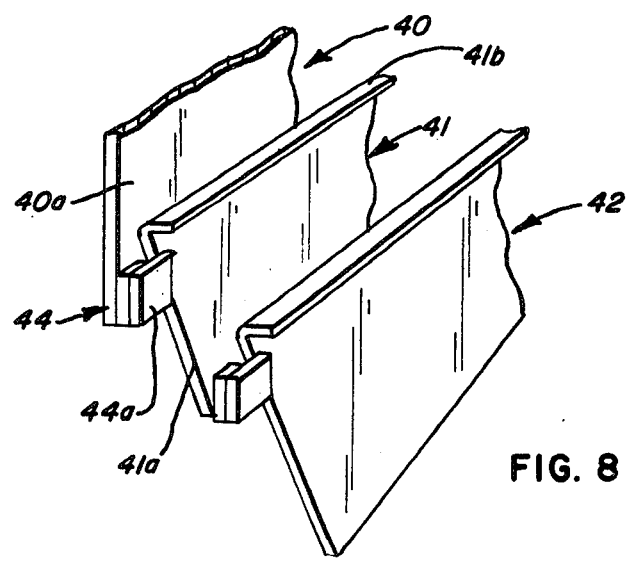
FIG. 8

LEVELER ASSEMBLY FOR A LOADING DOCK

BACKGROUND OF THE INVENTION

Leveler assemblies, sometimes referred to as dock levelers, have had widespread use in the past to facilitate the loading and unloading of various parked vehicles—such as trucks, vans and the like. With the advent of fork lift trucks and palletized products, the bulk handling of such products within a plant or warehouse was greatly improved while at the same time providing better protection for the products as well as the person handling the products. To provide greater ease in handling such products on a loading dock, fork lift trucks are frequently required to move directly into and out of the storage compartment of the vehicle. Thus, in order to permit such an operation, the dock leveler compensates for any height variation which might exist between the dock loading platform and the bed of the vehicle.

Movement of the deck member, which comprises a component of the leveler assembly, was normally achieved by either mechanical means embodying various springs and counterweights, or by fluid pressure. It is with respect to leveler assemblies utilizing fluid pressure that the instant invention is particularly directed.

Heretofore in prior dock levelers of the fluid pressure type, the structural designs thereof were frequently beset with one or more of the following shortcomings: (a) they were of complex, costly construction susceptible to frequent malfunction; (b) they did not possess adequate safety and fail-safe features for the protection of personnel, the product and the equipment handling the product; (c) they were incapable of compensating for a wide range of height variations between the dock loading platform and the load-bearing bed of the vehicle; and (d) they required an inordinate amount of manual labor and/or fluid pressure to properly position the deck member relative to the vehicle bed.

SUMMARY OF THE INVENTION

Thus, it is an object of the invention to provide a leveler assembly which is not beset with any of the aforenoted shortcomings.

It is a further object of the invention to provide a leveler assembly which is highly efficient in the use of fluid power to effect adjustment of the deck member.

It is a further object of the invention to provide a leveler assembly wherein the components thereof are readily accessible for servicing when required without necessitating substantial disassembly of the unit in order to gain access to a particular component.

It is a still further object of the invention to provide a leveler assembly wherein the operation of various components thereof are not adversely affected by debris or other foreign material which might accumulate within the pit.

Further and additional objects will appear from the description, accompanying drawings and appended claims.

In accordance with one embodiment of the invention a leveler assembly is provided which is adapted to be located within a pit formed in a loading dock. The pit is of conventional configuration and is provided with a base, a rear wall, an open top, and an open front side. The leveler assembly comprises a frame anchored to the base of the pit and having a front section located adjacent the open front side of the pit and recessed a substantial distance from the top of the pit. The frame also includes a rear section having an elevated top portion which is disposed adjacent to but beneath the open top of the pit. The leveler assembly is provided with a deck member having a rear edge portion hingedly connected to the top portion of the frame rear section and a front edge which is aligned with the pit open front side when the deck member assumes a neutral position. When the deck member is in the neutral position, the upper surface thereof is in coplanar relation with the platform surface of the loading dock. The orientation of the deck member may be varied relative to the platform surface by a fluid pressure-responsive telescoping means which has one component thereof adjustably connected to the underside of the deck member at a location which is substantially rearwardly of the front edge of the deck member. A second component of the telescoping means is adjustably connected to the frame front section. Suitable control means are provided for varying the fluid pressure within the telescoping means.

DESCRIPTION

For a more complete understanding of the invention reference is made to the drawings, wherein:

FIG. 5 is a fragmentary side elevational view of the deck member of the leveler assembly of FIG. 1 shown in a fully raised position and with a toe-guard unit attached thereto spanning the voids formed on either side of the deck member when the latter is in a raised condition.

FIG. 6 is an enlarged fragmentary sectional view taken along line 6—6 of FIG. 5.

FIG. 7 is an enlarged fragmentary sectional view taken along line 7—7 of FIG. 5.

FIG. 8 is a fragmentary perspective view of various components of the toe-guard unit shown in substantially fully expanded, void-spanning relation.

Figure 1:
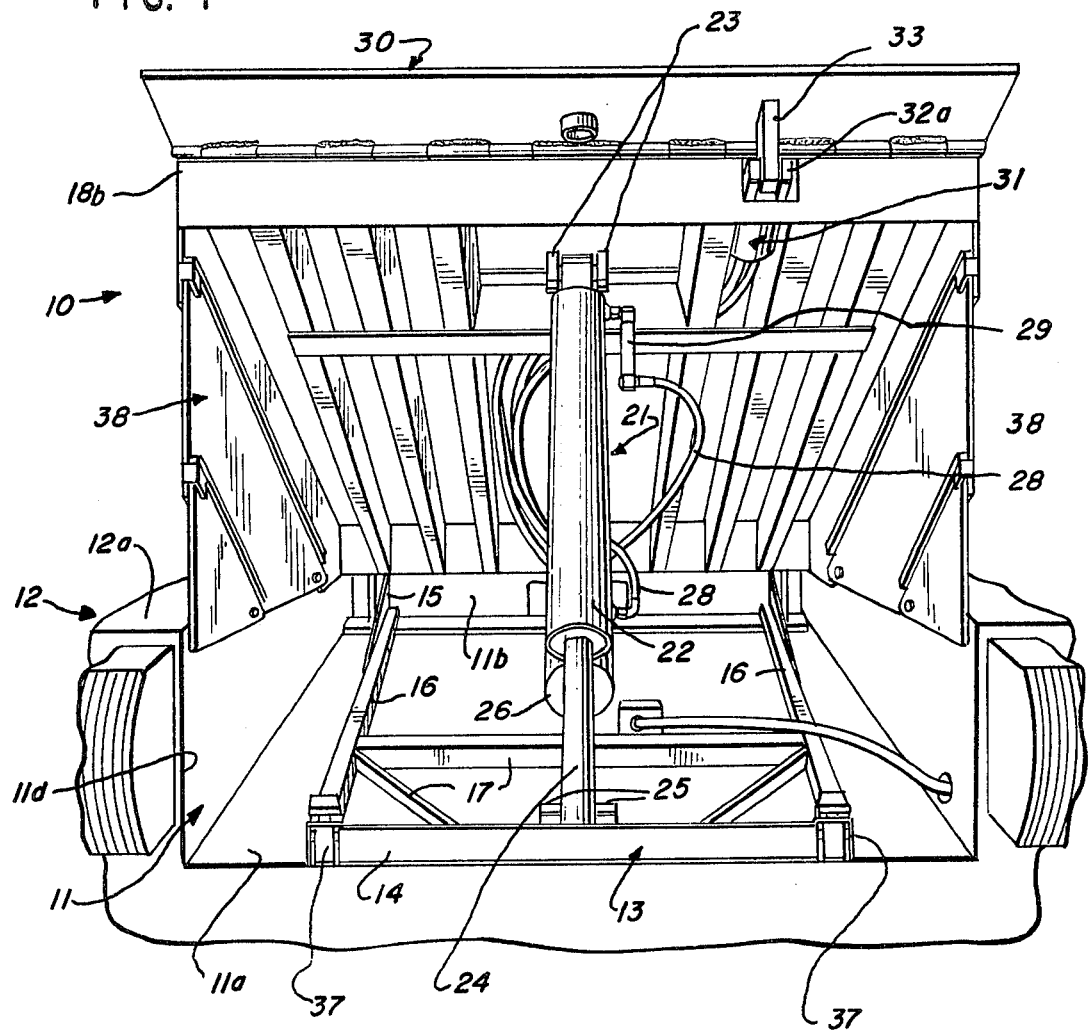
FIG. 1 is a front perspective view of one form of the improved leveler assembly and showing the deck member thereof in its fully raised or elevated position.
Figure 2:
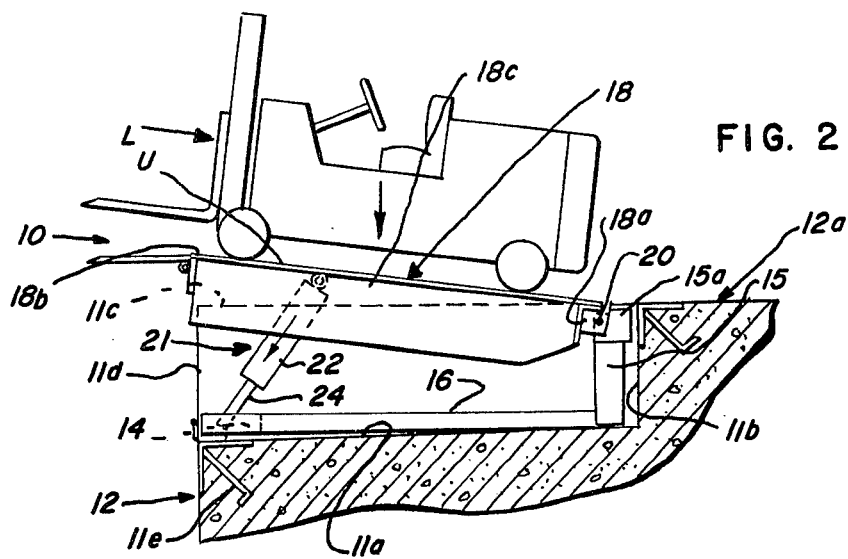
FIG. 2 is a fragmentary side elevational view, partially in vertical section, of the leveler assembly of FIG. 1 and showing the deck member in a raised position relative to the dock platform surface and showing a conventional fork lift truck positioned on the deck member.
Figure 3:
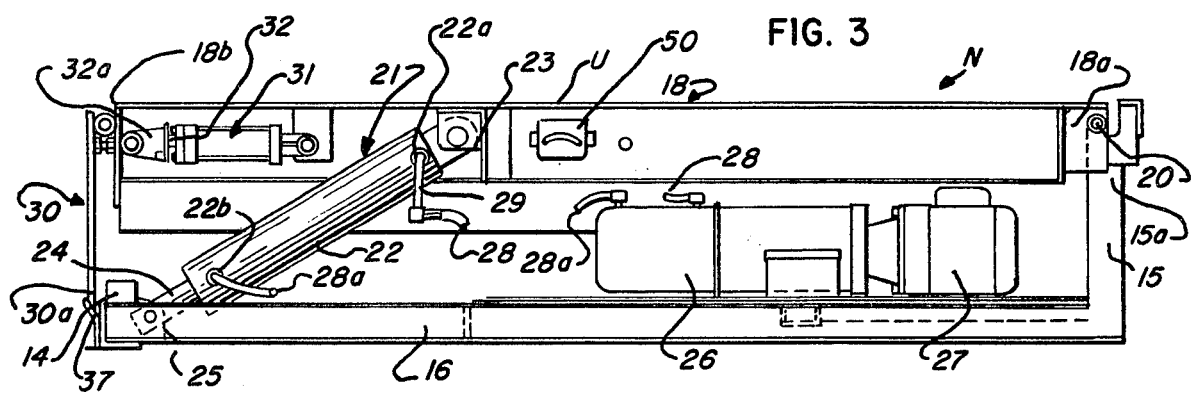
FIG. 3 is an enlarged, fragmentary vertical sectional view of the leveler assembly of FIG. 1 and showing the deck member in the neutral position.

Referring now to the drawings and more particularly to FIGS. 1–3, one form of the improved leveler assembly 10 is shown which is adapted to be located within a pit 11, the latter normally being provided in a loading dock 12. The pit includes a base 11a, a rear wall 11b, an open top 11c, and an open front side 11d. The front of the base 11a is strengthened by reinforcing members 11e embedded in concrete, see FIG. 2. Anchored to the base of the pit is a frame 13 which comprises a component of the leveler assembly. The frame 13 has a front section 14 and rear section 15, the latter having an elevated portion 15a which is disposed adjacent to but spaced below the pit open top 11c. The front section 14 comprises a beam which is aligned with and secured to the reinforced front edge of the base of the pit. The ends of the beam 14 are connected to corresponding ends of transverse beams 16 which extend rearwardly to the rear section 15. Other bracing members 17 are provided so as to strengthen the frame.

In addition to frame 13, the assembly 10 includes a deck member 18 having a peripheral configuration approximating the shape of the pit open top 11c. The deck member 18 has a substantially planar upper surface U over which a fork lift truck L or the like may move during loading or unloading of a vehicle T parked adjacent the loading dock 12.

Depending from the underside of the deck member and adjacent the rear edge thereof is a hinge bracket 18a which enables the deck member to be hingedly connected to the upper portion 15a of the frame rear section 15, see FIG. 2. Movement of the deck member about the hinge axis 20 is effected by a hydraulic cylinder assembly 21 which is disposed beneath the deck member 18. The cylinder component 22 of the assembly 21 is pivotally connected at its upper closed end to a depending bracket 23 affixed to the underside of deck member 18. The bracket 23 is spaced a substantial distance rearwardly of the front edge 18b of the deck member. The piston component 24 of the cylinder assembly is pivotally connected at its lower end to a bracket 25 affixed to the front section 14 of the frame 13. By reason of the location of the components 22, 24 of the cylinder assembly 21 and their respective attachment to the deck member and frame, the combined weight of the deck member and the load supported thereby are more evenly distributed between the frame front section 14 and rear section 15, thereby overcoming a serious problem associated with prior installations wherein one component of the cylinder assembly was connected to the frame rearwardly of the connection between the other component and the deck member. In such an arrangement there is a substantial unsupported cantilevered overhang of the deck member wherein repeated impact loads and/or shock load conditions resulting when a truck inadvertently pulls out from under the deck member can cause extreme load pressures on the entire structure and hydraulic systems resulting in the rear frame section pulling out or tending to pull out from the pit.

The hydraulic pressure required to effect relative movement of the components 22, 24 is supplied by a pump 26 driven by an electric motor 27, both of which are secured to the portion of the frame adjacent to but above the base 11a of the pit 11. Flexible liquid-tight tubing 28 interconnects the discharge side of the pump to a non-adjustable velocity fuse 29, which in turn is connected to an inlet port 22a provided at the pivoted, closed end of the cylinder component 22. An outlet port 22b is also formed on the cylinder component 22 and is connected to pump 26 by suitable return tubing 28a.

Hingedly connected to the front edge 18b of the deck member 18 is an extension plate or lip 30. The plate, when in an operative or fully extended position, is adapted to span the gap which exists between the front of the loading dock and the bed of a parked vehicle to be loaded or unloaded. Plate 30 allows the fork lift truck L to readily move between the deck member and the bed of the vehicle. The length of the plate 30 is substantially coextensive with the front edge 18b of deck member 18. Movement of the plate to various extended positions of hinged adjustment is effected by a secondary hydraulic piston cylinder assembly 31 which is affixed to the underside of deck member 18 and disposed close to the front edge thereof, see FIGS. 4 and 5. The exposed end 32a of the piston 32 of assembly 31 is pivotally connected to a lug 33 affixed to the underside or backside of the plate 30.

Also affixed to the underside of deck member 18 and disposed close to the path of travel of the piston 32 is a limit switch 34. Extending from the switch 34 is an arm 35, the outer end 35a of which is bifurcated and slidably connected to a pin 36 carried on the exposed end of the piston. The switch 34 automatically cuts off the operation of the hydraulic pump 27 once the extension plate 30 has reached its fully extended position, as will be described more fully hereinafter.

Figure 4:
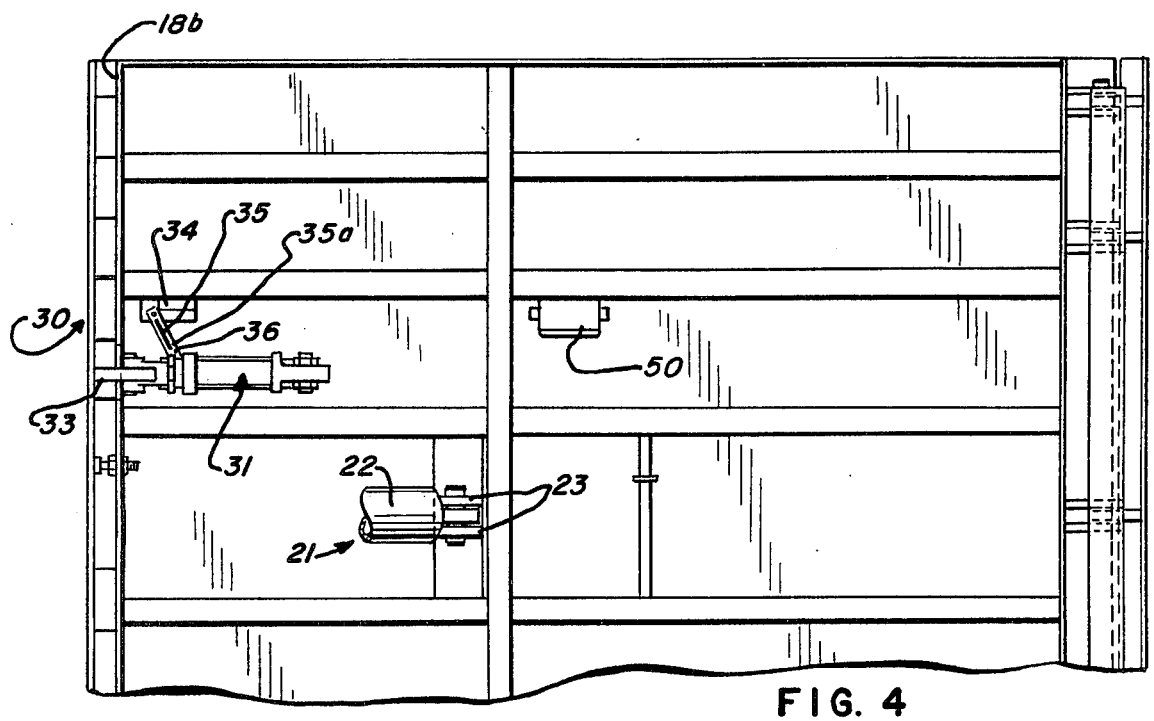
FIG. 4 is an enlarged fragmentary view of the underside of the deck member shown in FIG. 1.
Figure 2A:
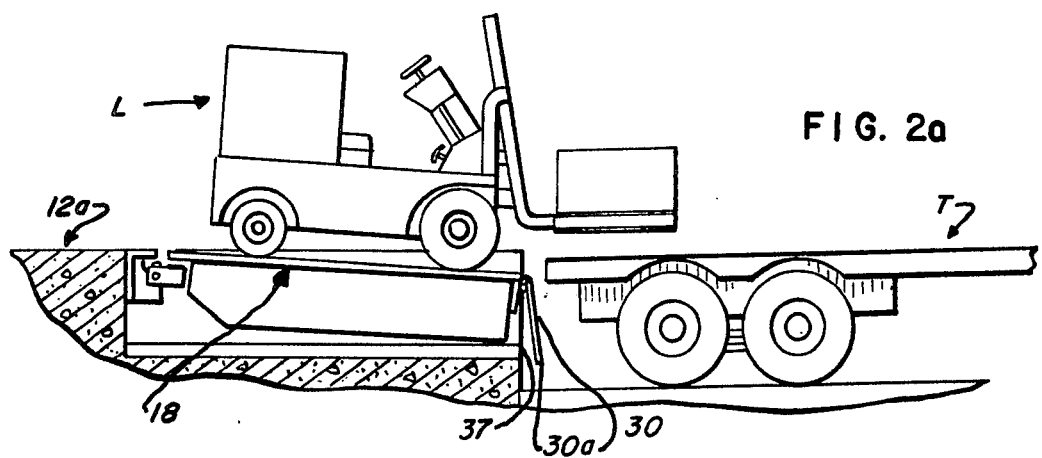
FIG. 2a is similar to FIG. 2 but with the deck member in a lowered position relative to its neutral position and showing a conventional fork lift truck end loading a flat-bedded truck parked at the loading dock.

When the deck member 18 is in a neutral position N, that is to say, when the exposed surface U of the deck member is coplanar with the platform surface 12a of the loading dock 12, the extension plate 30 may serve as a vertical support for the front edge 18b of the deck member, provided the plate 30 is in its fully pendant position (i.e., depends at a right angle from the underside of the deck member surface U) and the lower edge 30a of the plate engages behind relatively spaced keepers 37 formed on the front face of the frame front section 14, see FIG. 4. Thus, when the lower edge of the plate is engaging the keepers, as seen in FIG. 4, it is necessary for the deck member to be raised a slight amount so that the plate lower edge 30a clears the keepers before the plate 30 can be pivoted outwardly by the secondary hydraulic cylinder 31 to an extended position.

when the exposed surface of the deck member 18 is inclined relative to the platform surface 12a, as seen in FIG. 2a, it is necessary that the extension plate 30 be pivoted outwardly a slight amount so that the lower edge 30a will be out of alignment with the keepers 37 and pass in front thereof. When the deck member is in the inclined position shown in FIG. 2a, end loading or unloading of the bed of the truck T by a fork lift truck L may be readily accomplished.

A safety feature is provided on opposite side edges 18c of the deck member 18 in the form of toe-guard units 38. Each unit in the illustrated embodiment is of like construction and includes a plurality of plate-like members 40, 41 and 42, see FIGS. 6 and 8. The side edge 18c of the deck member 18, to which the toe-guard unit is connected, is normally reinforced by a depending channel-shaped flange 43 which has an offset upper leg 43a welded or otherwise secured to the underside of the deck member, and an offset lower leg 43b to which member 40 is bolted or otherwise fastened. Member 40, as seen in FIG. 6, has a substantially L-shaped cross-sectional configuration with the long leg 40a thereof extending downwardly. Mounted on the lower front exterior portion of leg 40a is a stop guide 44, see FIGS. 5, 7 and 8. The guide 44 includes a straplike piece 44a which is retained in proper spaced relation from the exterior surface of leg 40a by a spacer block 44b. The piece 44a and block 44b are welded or otherwise secured as a unit to the exterior surface of the leg. The distance that piece 44a is spaced from the exterior surface of the leg 40a is slightly greater than the thickness of the material of which member 41 is made. Thus, the forward edge 41a of member 41 is slidably disposed between the piece 44a and the exterior surface of leg 40a, as seen more clearly in FIG. 8. To prevent the forward edge 41a of member 41 becoming disengaged from the stop guide 44, when the deck member 18 is in its fully raised position, the upper edge of member 41 is offset outwardly a slight amount so as to form a ledge 41b. As seen in FIG. 5, the rear end portion of member 41 is pivotally connected at 41c to the depending leg 40a of member 40.

A similar structure, including a stop guide 44, is embodied in member 42, except that the rear portion of member 42 is pivotally connected at 42a to member 41 at approximately its mid-length, see FIG. 5.

Thus, as the deck member moves to an elevated position, as seen in FIG. 1, gravity will cause members 41 and 42 to pivot about their respective axes and thereby fill the voids at the sides of the deck member which exist between the underside of the deck member and the plane of the platform surface 12a. By closing the voids with the pivoted members in an expanded state, feet, toes, arms, etc. are prevented from becoming crushed between the deck member and the adjacent portions of the platform surface when the deck member resumes its neutral position N. When the deck member is in its neutral position N or its inclined position, as seen in FIG. 2a, the lower edge of the forward portions of members 41, 42 will engage the bottom surface 11a of the pit or any debris accumulated thereon and cause the members to pivot independently in a clockwise direction about their respective axes, as viewed in FIG. 5, and assume a collapsed condition.

Figure 9:
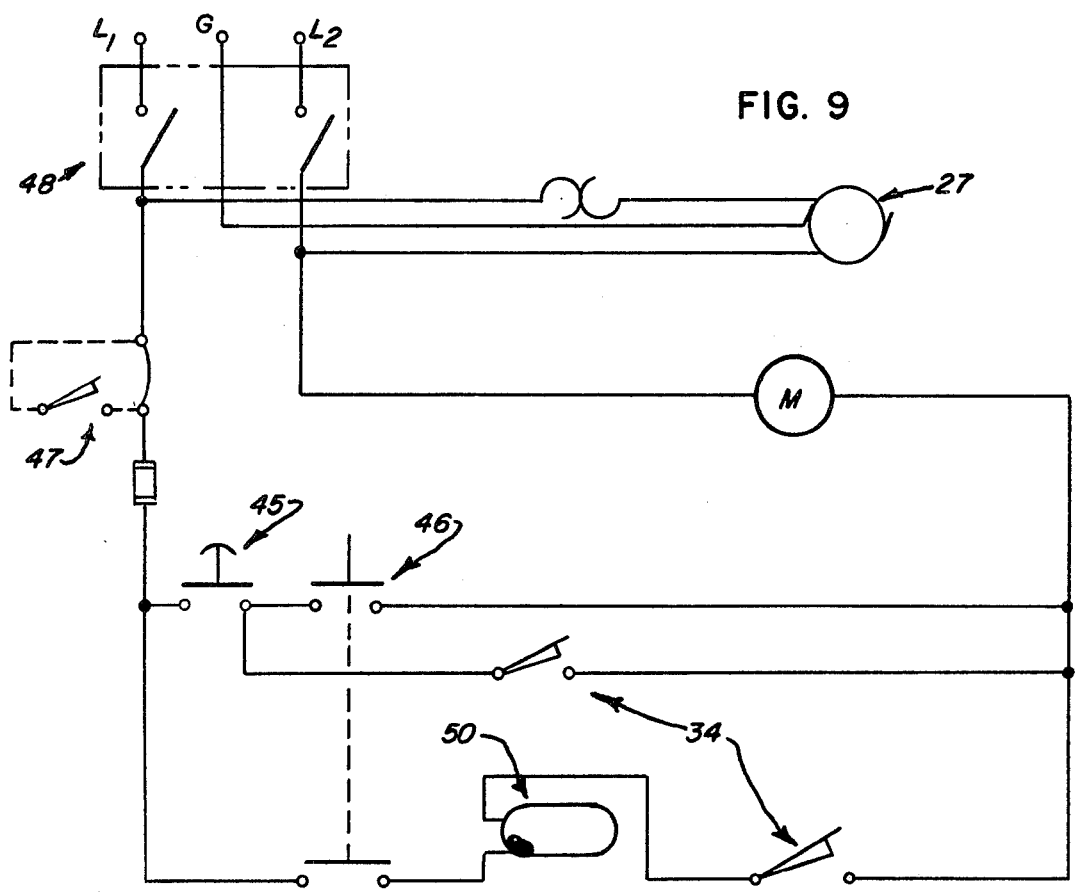
FIG. 9 is an electrical circuit diagram for one form of the improved leveler assembly.

The electrical circuit for controlling the operation of the pump motor 27 is shown in FIG. 9. The circuit includes a push-type switch 45 which must be manually depressed and held in such a depressed state until the deck member 18 has reached its fully elevated position and the extension plate 30 has moved to its fully extended position. A sequence selector 46 is also provided which is manually adjustable between "auto" and "lower" modes. The switch 45 and selector 46 are preferably mounted on a common panel, not shown, which is normally located remotely from the deck member and within the plant, warehouse or like building served by the loading dock. The pit 11 of the loading dock is normally aligned with an opening or doorway to the interior of the plant, warehouse or the like. Such an opening or doorway is normally closed by an overhead door when the leveler assembly is not in use. The panel for the switch and selector is preferably located just inside the doorway served by the leveler assembly and, thus, when the door is closed, unauthorized manipulation of the deck member is prevented. An auxiliary interlock switch 47 operable by the door may be provided between the start switch 45 and the power outlet 48 for the plant or warehouse. The switch 47 assumes an open position when the door is in its closed position. The electrical circuit is provided with the limit switch 34 which is normally held closed by the extension plate 30, when the latter is in its non-extended or pendant position, see FIGS. 3 and 4. As aforementioned, movement of switch 34 to its open position is controlled by the piston 32 which is connected to and moves the extension plate 30.

In addition to the limit switch 34 there is provided a mercury switch 50 which is affixed directly to the underside of the deck member 18, see FIGS. 3 and 4. The function of the mercury switch will be described more fully hereinafter.

Figure 10:
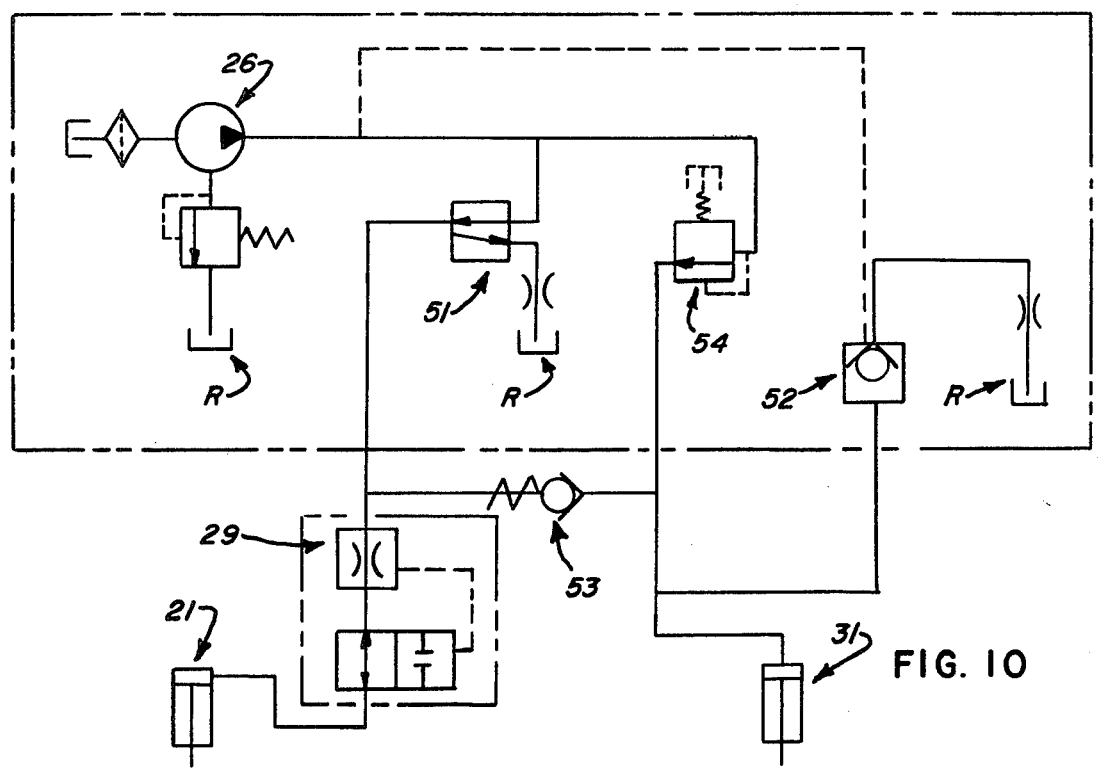
FIG. 10 is a hydraulic circuit diagram for one form of the improved leveler assembly.

The hydraulic circuit for the leveler assembly is shown schematically in FIG. 10. Besides the motor-driven pump 26 and the main and auxiliary hydraulic piston-cylinder assemblies 21, 31, respectively, the circuit includes a shuttle valve 51, a velocity fuse 29, a first check valve 52, a second check valve 53 and a sequence valve 54.

The operation of the electro hydraulic circuits is as follows: (a) with the selector 46 adjusted to its normal automatic position, the motor 27 is energized when the switch 45 is manually depressed and is held in a depressed state; (b) with the pump operating, the first check valve 52 is piloted to an open position whereupon oil within the auxiliary cylinder 31 is bled to a reservoir R, causing the extension plate 30 to remain in its pendant position; (c) simultaneously with the piloting of the check valve 52, shuttle valve 51 moves to a position wherein flow to the reservoir R is closed off and full flow is directed to the velocity fuse 29; (d) the flow from the velocity fuse is to the main cylinder inlet port 22a causing the front edge 18b of the deck member 18 to be elevated by pivoting the deck member in a clockwise direction about axis 20, see FIG. 3; (e) once the components of the main cylinder 21 have reached a fully extended relative position and while pump 26 continues to operate, a pressure buildup (below the overall system relief pressure) occurs ahead of cylinder 21 causing the sequence valve 54 to assume a position wherein flow is diverted to the auxiliary cylinder assembly 31 and the piston 32 thereof moves outwardly causing the extension plate 30 to assume a fully extended position; (f) upon the extension plate 30 attaining its fully extended position, the push button start switch 45 is released whereupon the deck member 18 and extended extension plate 30 move, or float, downwardly as a unit until the extended plate 30 rests upon the bed of the vehicle parked at the loading dock; the extension plate 30 remains in its extended position while moving downwardly onto the bed of the vehicle because the check valve 53 and the priority oil backflow of a predetermined amount from the main cylinder 21 prevent any backflow in the auxiliary cylinder circuit; during this time check valve 52 remains closed and the line from the sequence valve 54 to the reservoir R is blocked; (g) when the vehicle moves away from the loading dock and the bed thereof slides out from under the extension plate 30, the deck member 18 and extension plate 30 will once again continue to move, or float, downwardly to the base 11a of the pit 11 whereupon the mercury switch 50, carried on the underside of the deck member 18, will close; because the hydraulic flow in the main cylinder 21 at this point is zero, the check valve 53 will open allowing flow from the auxiliary cylinder to the reservoir; and (h) when the mercury switch 50 has closed and the extension plate 30 moves to its pendant position because of the flow from cylinder 31 through check valve 53 to the reservoir, the limit switch 34 in series with the mercury switch 50 closes causing automatic energizing of the pump motor 27 and the generated fluid pressure effects pivoting of the deck member 18 in a clockwise direction (FIG. 3) while the extension plate 30 moves to its fully pendant position; the pump motor 27 will continue to operate until the deck member 18 has pivoted to approximately 5° above its neutral position at which point, the mercury switch 50 opens and the motor 27 ceases to operate; the deck member and extension plate then once again float downwardly to the neutral position whereupon the free edge 30a of the fully pendant plate 30 will automatically engage behind the keepers 37 disposed on the front section 14 of the frame 13 and retain the deck member 18 at its neutral position wherein the exposed upper surface U thereof is substantially flush with the platform surface 12a and, thus, permits cross traffic to pass thereover.

When the deck member 18 is to assume an inclined position with respect to the platform surface, as seen more clearly in FIG. 2a, the following procedure is recommended: (a) the selector 46 is manually adjusted to its "lower" mode position; (b) the starter switch 45 is manually held in a depressed state until the deck member 18 assumes its fully elevated state (pivoted in a clockwise direction to the fullest extent) and the extension plate 30 has pivoted a few degrees in a clockwise direction from its fully pendant position so that the lower (free) edge 30a of the plate will clear the keepers 37 and the limit switch 34 will be opened by the extended piston rod 32; upon release of the starter switch 45, the deck member 18 and partially extended extension plate 30 will slowly float as a unit to the base of the pit and remain in such a position because the electrical circuit to the pump motor 27 is opened. In order to return the deck member to its neutral position, requires the selector 46 to be manually reset to its "automatic" mode whereupon the deck member and pendant extension plate will move as described in the sequence operational step (h) above.

The velocity fuse 29 disposed within the hydraulic circuit ahead of the inlet port 22a of the main cylinder 22 is spring loaded and will close when the backflow from the cylinder 22 exceeds a predetermined rate (e.g., 7½ gpm) thereby causing the deck member 18 to lock up in a safe position.

By having the closed end of cylinder 22 pivotally connected to the underside of deck member 18, a substantial amount of the hydraulic hosing and associated electrical components may be located adjacent the underside of the deck member 18 and away from the base 11a of pit wherein debris might accumulate. Furthermore, the inversion of the cylinder 22—that is to say, with the closed end connected to the underside of the deck member 18—a natural reservoir for the residual hydraulic fluid is maintained at all times and prevents the possibility of a sudden uncontrolled drop of the deck member and extension plate, when a vehicle leaves the loading dock area.

It will be noted that the extension plate does not require mechanical dogs and latches to maintain it in an extended position but instead relies on hydraulic fluid which provides yieldable retention of the plate in its extended position. Thus, if the extended plate 30 is accidentally struck by a vehicle, the plate 30 will merely pivot in a counter-clockwise direction without serious damage resulting thereto. Furthermore, the extended plate 30 will not free fall in the event of a vehicle pull out since the cylinder assembly 31 smoothly monitors the movement of the plate 30 to the pendant position, as aforedescribed, thereby reducing the noise level and safety hazards heretofore associated with prior dock leveler installations.

The size and configuration of the various components of the improved leveler assembly may vary from that shown and described and will depend upon the type, weight, and size of the products normally handled on the loading dock in which it is installed.

Servicing of the various components of the leveler assembly, including hydraulic hosing, various switches, valves and the like, can be readily taken care of from the pit open front side when the deck member is in its elevated position.

Thus, it will be seen that a leveler assembly has been provided which is efficient in its operation; is readily capable of accommodating a wide range of level differentials between the platform surface of the loading dock and the bed of the parked vehicle; is tamper-proof when the deck member is in its neutral position and the overhead door is locked in a closed position; is capable of one man operation; and substantially reduces noise levels and safety hazards when in operation.

We claim:

1. A leveler assembly for use within a pit formed in the platform surface of a loading dock, the pit having a base recessed from the platform surface, a rear wall, an open top, and an open front side adjacent the front of the loading dock; said leveler assembly comprising a stationary frame adapted to be anchored within the pit, said frame having a front section positionable adjacent the pit open front side and recessed from the plane of the platform surface, and a rear section positionable adjacent the pit rear wall and having an elevated portion adapted to be disposed adjacent to but beneath the plane of the platform surface; a deck member hingedly mounted on the elevated portion of the frame rear section, the periphery of said deck member being adapted to conform substantially to the configuration of the pit open top, said deck member being adapted to normally assume a neutral position of hinged adjustment wherein the upper surface of said deck member is adapted to be substantially coplanar with the platform surface and a front edge of the upper surface is adjacent the pit open front side; a hydraulic piston-cylinder unit having an exposed piston end hingedly connected to said frame front section and a closed cylinder end hingedly connected to the underside of said deck member at a location spaced rearwardly a substantial distance from the front edge of said dock member wherein the piston-cylinder unit extends angularly upwardly and rearwardly from said frame front section for all positions of hinged adjustment of said deck member; said control means for regulating the hydraulic fluid pressure within the cylinder adjacent the closed end thereof and the orientation of said dock member relative to the platform surface.

2. The leveler assembly of claim 1 wherein the front edge of the deck member has hingedly connected thereto extension means, and the underside of said deck member is provided with an auxiliary hydraulic piston-cylinder unit for controlling the hinge adjustment of said extension means between extended and non-extended positions.

3. The leveler assembly of claim 2 wherein the control means for regulating the fluid pressure within the telescoping means embodies an electrical circuit having as a component thereof a switch means which, when said circuit is in one operating mode, is responsive to the orientation of said deck member downwardly relative the neutral position, and causes predetermined fluid pressure to be exerted upon components of the telescoping means and effect automatic return of said deck member to said neutral position.

4. The leveler assembly of claim 3 wherein movement of the extension means to a fully extended position occurs only after the deck member front edge has reached a predetermined elevated position relative to the platform surface of the loading dock.

5. The leveler assembly of claim 1 wherein the underside of the deck member has depending therefrom safety means disposed adjacent opposing side edges of the deck member and being substantially coextensive therewith; said safety means including an adjustable wall unit having a lower edge adapted to extend into the pit and remain beneath the platform surface of the loading dock for all positions of adjustment of said deck member.

6. The leveler assembly of claim 5 wherein the wall unit of the safety means at each side edge of the deck member comprises a plurality of interfitting, depending panels of graduated lengths arranged in side-by-side relation and with the longest panel being substantially aligned with and secured to the side edge of the deck member, adjacent panels being connected for limited pivotal movement, each pivotal connection being spaced a substantial distance from the deck member front edge, each panel having a corresponding front edge disposed substantially adjacent the deck member front edge when said deck member is in said neutral position.

7. The leveler assembly of claim 6 wherein each pivotally connected panel has an offset portion engaging a stop means carried on the preceding panel, only when the pivotally connected panel has pivoted in one direction through a predetermined sector.

* * * * *

UNITED STATES PATENT AND TRADEMARK OFFICE
CERTIFICATE OF CORRECTION

PATENT NO. : 4,110,860
DATED : SEPTEMBER 5, 1978
INVENTOR(S) : ROBERT O. NEFF, LYNN O. GRUNWALD,
RODERICK B. POTTER and NORBERT HAHN It is certified that error appears in the above-identified patent and that said Letters Patent are hereby corrected as shown below:

Column 4, line 36 - "when" should be --When--

Column 5, line 33 - before "switch" insert --start--

Column 8, line 43 (Claim 1) - "said" (second occurrence) should be --and--

Column 8, lines 56 and 61-62 (Claim 3) - "telescoping means" should be --cylinder unit--

Signed and Sealed this

Fifteenth Day of May 1979

[SEAL]

Attest:

RUTH C. MASON
Attesting Officer

DONALD W. BANNER
Commissioner of Patents and Trademarks